United States Patent [19]

Dirksen et al.

[11] Patent Number: 5,682,377
[45] Date of Patent: Oct. 28, 1997

[54] TRANSMISSION SYSTEM FOR DATA CELLS IN A LOCAL NETWORK

[75] Inventors: Mark Johannes Gerardus Dirksen, Leidschendam; Frederikus Hendrikus Leerkes, The Hague, both of Netherlands

[73] Assignee: Koninklijke PTT Nederland N.V., Groningen, Netherlands

[21] Appl. No.: 558,920

[22] Filed: Nov. 13, 1995

[30] Foreign Application Priority Data

Nov. 25, 1994 [NL] Netherlands ............ 9401978

[51] Int. Cl.$^6$ ............ H04L 12/54; H04Q 7/00
[52] U.S. Cl. ............ 370/236; 370/244; 370/429
[58] Field of Search ............ 370/17, 60, 60.1, 370/61, 85.6, 94.1, 94.2, 216, 230, 231, 232, 235, 236, 242, 244, 250, 252, 253, 389, 412, 413, 428, 429, 458, 459, 522; 340/825.5, 825.51, 825.52; 371/37.1, 37.3, 41

[56] References Cited

U.S. PATENT DOCUMENTS

| | | | |
|---|---|---|---|
| 5,179,557 | 1/1993 | Kudo | 370/94.1 |
| 5,233,606 | 8/1993 | Pashan et al. | 370/85.6 |
| 5,278,830 | 1/1994 | Kudo | 370/94.1 |
| 5,381,407 | 1/1995 | Chao | 370/60 |
| 5,563,885 | 10/1996 | Witchey | 370/94.2 |

OTHER PUBLICATIONS

T. Toniatti et al; "Performance of Shared Medium Access Protocols for ATM Traffic Concentration"; Mar.–Apr. 1994; pp. 91–98; European Transactions on Telecommunications and Related Technologies; vol. 5, No. 2.

J.D. Angelopoulos et al; "A Distributed FIFO Spacer/Multiplexer for Access to Tree APON's"; 1994; pp. 70–74; 1994 IEEE.

*Primary Examiner*—Alpus H. Hsu
*Attorney, Agent, or Firm*—Frishauf, Holtz, Goodman, Langer & Chick

[57] ABSTRACT

In a transmission system for the transmission of data cells between local stations and a central station, cell arrivals are registered in a local register (CAR). Those registrations are periodically transmitted to the central station. The central station thereafter transmits the permit codes to the various local stations, in order to transmit the data cells which are most ready. In each local station the data cell which is most ready for transmission is transferred from a cell arrival buffer (CAB) to a cell departure buffer (CDB) as long as the permit code expected for the station, on the basis of the number of time slots since the cell arrival, remains forthcoming. The data cell remains in the buffer as long as no permit code addressed to the station is received. The data cell is transmitted as yet after the reception of a permit code addressed to the station. The data cell is discarded, however, as soon as an empty (unaddressed) permit code is received while the data cell still resides in the buffer. All this has the effect that transmission errors do not permanently frustrate the system.

2 Claims, 5 Drawing Sheets

TRANSMISSION SYSTEM FOR DATA CELLS IN A LOCAL NETWORK

BACKGROUND OF THE INVENTION

The invention relates to a transmission system for the transmission to a central station of data cells presented to local stations, and to the transmission to the local stations of data cells presented to said central station.

A system of this type is the subject of an earlier patent application in the name of the applicant. The content of this patent application, U.S. patent application No. 08/544,210, is deemed to be included in the present application, and is incorporated herein by reference.

In particular, but not exclusively, the present invention is intended as an improvement of the earlier system, particularly regarding its robustness (fault tolerance). In fact, the earlier system only operates correctly if no transmission errors occur. If these do occur, a problem arises which is not automatically solved by the system.

Each time a data cell is presented to a local station in the earlier system, it is temporarily stored in a cell buffer in each local station and a first character (for example, a "1" bit) is entered in a register. If an empty time slot is presented to the local station, a second character (for example, a "0" bit) is entered in the register. The registers—called "cell arrival bit (CAB) buffers" in the said application—of the local stations are periodically read out and their contents are transmitted to the central station in the form of register codes, for example four register codes in one time slot. After reception of the register codes from the local stations, the central station transmits permit codes to the local stations on the basis of the first characters ("1") in these register codes. The permit codes arrange which local station, designated by the value of the permit code, is allowed to transmit a data cell to the central station.

If one bit error occurs in the transmission of the register codes, it can be detected and restored by means of a "Cyclic Redundancy Check" (CRC) field in the slot. More bit errors can be detected but cannot be restored. If on arrival at the central station such a multiple error is detected in a slot containing register codes of local stations, the contents of said slot can best be discarded, since having the local stations generate the register codes again is a very complex matter. In the local stations, however, the treatment of the data cells which are buffered there awaiting a (their) permit code must be adapted to the situation in the central station—which, of course, has been drastically changed by discarding the incorrectly transmitted register codes.

Errors can also occur in the transmission of permit codes, from the central station to the local stations. If only one bit error occurs in the slot in which the permit code is transmitted, it can be corrected; although the occurrence of bit errors can be detected if there are more errors, they cannot be restored. In that case the contents of the time slot, including the permit code, are discarded. The processing of the data cells in the local stations must be adapted in that case as well, so that the error will not be propagated in the system.

The adaptation mechanism in the local stations is the subject of this application.

SUMMARY OF THE INVENTION

For the following disquisition, on which the invention is based, the reader is also requested to consult the said incorporated application, in particular the figures and the figure descriptions. Assume that a data cell X arrives at a local station t time slots after the last register code—of which the bits represent the arrival times of the data cells—has been transmitted to the central station. The registration bit of this data cell X—as part of the register code—is only transmitted if the register is full. If the frame period, that is the time, expressed in terms of time slots, required to traverse the register is represented by T, the proximate register code, including the registration bit of data cell X, will be transmitted after (T–t) time slots, calculated from the arrival time of data cell X. In the central station, the register codes from all local stations are entered into shift registers. The bits shift up one bit position per time slot and each time a bit value (for example) is "1", a permit code for one local station is generated. For more "competitive" "1" bits—signifying data cells which have arrived simultaneously at different local stations—successive permit codes for the local stations concerned are generated. Without competitive "1" bits, the permit code related to data cell X is transmitted after a time t. The total waiting period in the local station (T–t) and in the central station (t) is therefore (T–t)+t=T, that is, equal to the frame period. Besides the (buffer) waiting period, the propagation delays due to the physical connections between the local station and the central station and vice versa should be taken into account. In an optimally configured system, the slot period is chosen such that the total propagation time is equal to the frame period T. The total waiting and propagation delay thus amounts to 2*T. The present invention is based on this observation and has the objective of obviating the disadvantage of the error sensitivity of the known system (and similar systems).

Besides the said cell buffer—hereinafter referred to as cell arrival buffer (CAB)—the transmission system according to the invention also comprises a cell departure buffer (CDB). Further, the length of the cell arrival register (CAR)—referred to as "CAB (=cell arrival bit) buffer" in the earlier application—is doubled, resulting in a bit propagation period through the CAR of 2*T time slots.

The oldest bit thus remains in the CAR for 2*T time slots; the oldest data cell ready for transmission then remains in the CAB for 2*T. The permit code related to said oldest data cell can be expected to arrive at the local station concerned at the same moment. The permit code can only remain forthcoming for one or a few time slots if the oldest data cell arrived at the local station concerned 2*T time slots earlier with the same time slot as other data cells at other local stations (the "competition" situation mentioned above), forcing the central station to generate the permit codes for the simultaneously arrived data cells in succession. If the permit code does indeed arrive at the expected moment, the oldest data cell most ready for transmission is put on the line to the central station. If the permit code briefly remains forthcoming, the oldest data cell is transferred to the said cell departure buffer (CDB) until, one or a few time slots later, a permit code intended for said station and related to said data cell as yet arrives, after which the data cell is put, from the CDB, on the line to the central station. As long as data cells are received not intended for the station concerned, the data cell remains in the CDB. After the reception of a permit code intended for said station, the data cell is transmitted. If at a certain time, however, an "empty" permit code (a time slot with an empty permit code field, or at any rate a permit code field to which a value has been (intentionally) given by the central station with a meaning which is recognisable for the local stations as "not intended for any of the local stations"), arrives, then this is a sign that something has gone wrong in either the transmission of the permit codes or already, prior to that, in the transmission of the register code. In that case the data cell in the CDB is discarded, since the permit code relating to said data cell has apparently been lost. Any other data cells in the CDB are also discarded since for each of those data cells in the CDB a permit code was expected; if those permit codes have apparently been lost (which is evident from the arrival of the empty permit code) all data cells corresponding to those lost permit codes are abandoned.

It is remarked that the present application is not only intended as an improvement of the transmission system in the earlier application of the applicant, but also has the objective of offering an improved fault tolerance for other transmission systems (see references of the earlier application referred to) in which arrivals of data cells at a local station are registered in a cell arrival register, each local station transmits the characters entered in the cell arrival register to the central station and the central station subsequently transmits the permit codes to the local stations. According to the present invention, therefore, a data cell ready for transmission is transmitted to a cell departure buffer (CDB) if the permit code related to said data cell was not received, or the data cell ready for transmission is transmitted to the central station if the permit code related to said data cell was indeed received. If the data cell ready for transmission was transmitted to the cell departure buffer, said data cell will remain in the cell departure buffer as long as no permit codes intended for the local station concerned are received. However, after the reception of a permit code intended for said local station, the data cell staying in the cell departure buffer is as yet transmitted to the central station; conversely, said data cell, together with any other data cells in the cell departure buffer, is discarded as soon as an "empty" permit code is received which was (intentionally) not addressed to any of the local stations by the central station and which is recognised as such by the local stations.

Hereinafter the invention is further expounded on the basis of a number of figures.

BRIEF DESCRIPTION OF THE DRAWING

The following also makes use of the contents of the above-mentioned incorporated application of the applicant.

DETAILED DESCRIPTION

Figure 5:
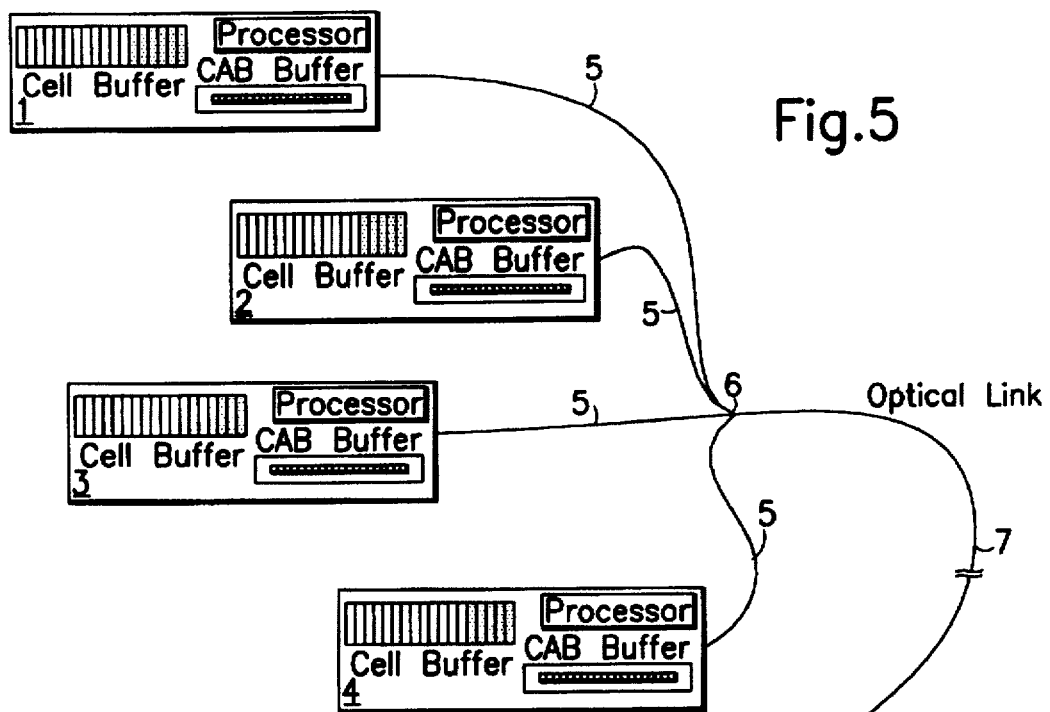
FIG. 5 shows four subscriber or local stations which are connected to a central station via a passive optical link.
Figure 5:
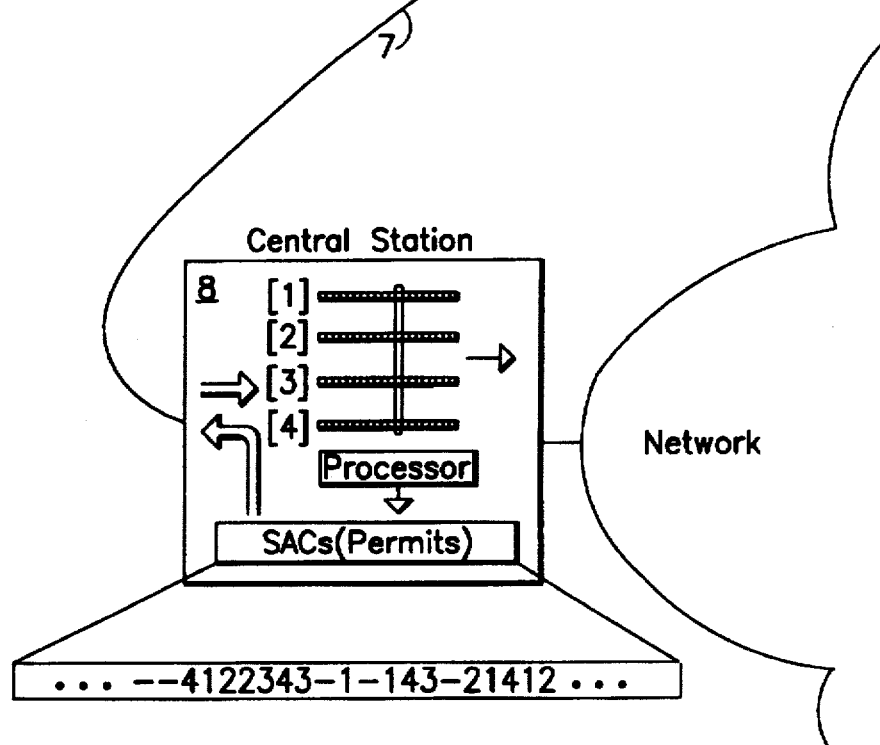

FIG. 5 shows a number of subscriber or local stations 1 through 4 which are connected, via a passive optical network formed by glass fibers 5, a passive coupler/splitter 6 and a glass fiber 7, common to the subscriber stations, to a central station 8 which gives access to a network. Each subscriber station may be presented with ATM cells which can be transmitted to the central station 8. At the same time, ATM cells can be transmitted from the central station to the subscriber stations. These cells are then presented to all subscriber stations, each subscriber station picking up only cells intended for that station and passing them on. Cells which are presented by a subscriber at his subscriber station and are intended for the central station are buffered in that subscriber station in a cell buffer, pending a dispatch permission code (permit) to be emitted by the central station. In order to notify the central station of the fact that the subscriber station wants to dispatch a cell, a code has to be sent to the central station. Were such a code to contain no more information than the simple message that subscriber station number such and such has received a cell and wishes to dispatch it, the central station would not be able to take into account the time of presentation of different subscriber stations. Consequently, a cell which had been presented early on at the one subscriber station could not be given priority above a cell presented subsequently at another subscriber station. Since this "FIFO" principle is desirable from a performance point of view, that is, this is how any accumulation of cells is forestalled, provision is made according to the invention for timing information indeed to be transmitted, and this takes place in a simple, but effective manner. As a matter of fact, not only is a code generated if an ATM is presented during a time slot, but also if a time slot is empty. In the case of an empty time slot a code "0" is generated, and a code "1" in the case of a time slot filled with a cell. Thus, a code sequence is formed, the CAB string, which reflects the times of arrival of successive cells. If, as presented in FIG. 5 in subscriber station 1, out of twenty successive time slots, a cell was presented only on the fourth, eleventh, thirteenth, eighteenth and nineteenth time slots, this is represented by the CAB string "01100001010000001000". This string consists of 0-bits, except the fourteenth, eleventh, thirteenth, eighteenth and nineteenth locations (from right to left). As long as the cells, five in total, cannot be dispatched, they are buffered in a cell buffer. Similarly, FIG. 5 depicts, next to the subscriber stations 2 through 4, the CAB strings "01010000000000011000", "00000100000101000000" and "00100010000010000100". The cells themselves are buffered in the cell buffers in the various subscriber stations. The various CAB strings are sent to the central station during one or possibly several time slots.

Figure 1:
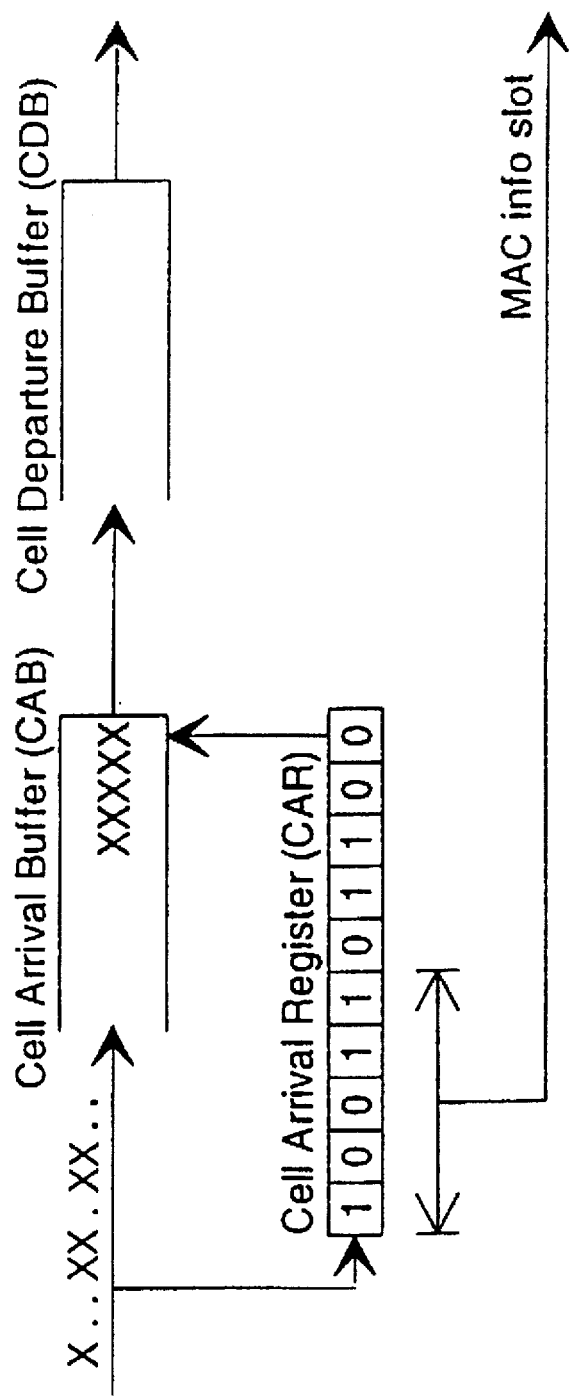
FIG. 1 diagrammatically shows a local station with a cell arrival buffer (CAB), a cell arrival register (CAR) and a cell departure buffer (CDB), where for the sake of clarity a frame length has been assumed of only five time slots (in practice, for example, that would be 72 time slots).

FIG. 1 shows a local station at which data cells arrive in different time slots. These are buffered in a cell arrival buffer (CAB). Each time a data cell does not arrive in a time slot, a "0" is entered in a cell arrival register (CAR)—a shift register—whereas each time a data cell does arrive a "1" is registered (other codes are, of course, equally possible). After every five time slots (frame period T), the register codes from all local stations, consisting of the last (most recent) five bits registered in the CAR are put on the line to the central station—in a "MAC (Medium Access Control) info slot" referred to in FIG. 1. There, they are converted into permit codes for the various local stations where data cells arrived. The sequence of those permit codes corresponds with the position of the "1" bits in the register codes of the various local stations. If the "oldest"—in the Fig. the rightmost—bit is a "1", then the "oldest"—in the Fig. the rightmost—data cell is put on the line to the central station if at the same time the expected permit code for said station arrives. If said permit code remains forthcoming, then the data cell is transferred to a cell departure buffer (CDB) where it remains until a permit code intended for the local station is received.

Figure 2:
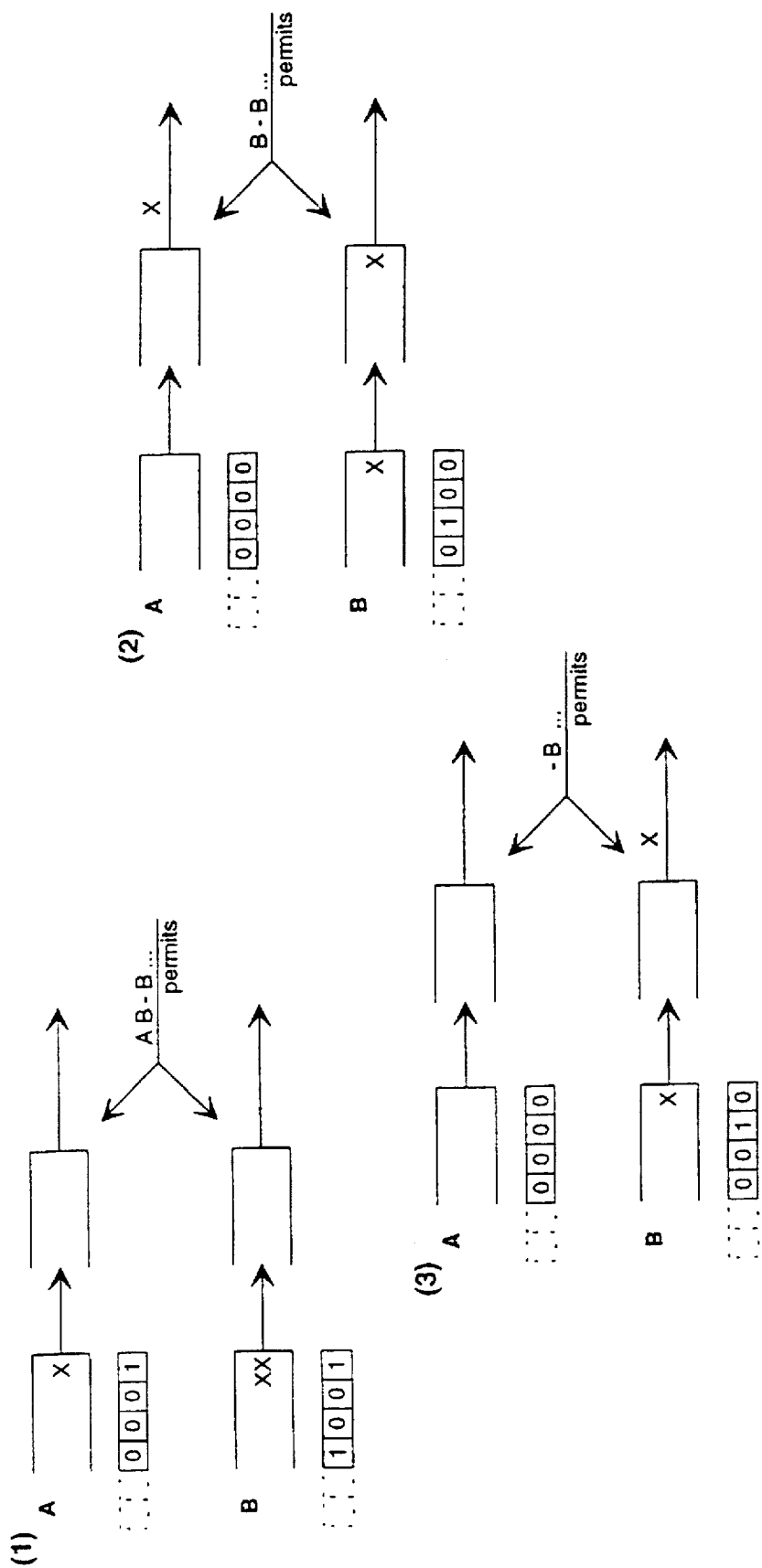
FIG. 2 illustrates the functioning during error-free operation.

FIG. 2 shows two local stations, A and B, both provided with a CAB, a CAR and a CDB. It is shown that two time frames ago (2*T=10 time slots) a data cell arrived at A as well as at B, represented by an "X" in the CABs of both stations A and B in the rightmost position in the CABs, as well as by a "1" in the rightmost position in the CAR. Under control of said rightmost "1" in both CARs, the data cells in both CABs can, at this moment, be transmitted to the CDBs. Meanwhile, however, the register codes in the central station—transmitted 10 time slots earlier—have been processed into permit codes which precisely at this moment have arrived back again at the local stations A and B, that is, two directly consecutive permit codes, one for A and one for B (the one for B thus arriving one time slot later than the one for A, being a choice made in the central station). Due to the reception of the permit code for station A, this station does not transmit the data cell to the CDB but, per proximate time slot, puts it on the line to the central station. In station B the data cell is indeed stored in the CDB, since the permit code to be expected for station B has not yet arrived. However, the permit code for station B arrives one time slot later (see sub-FIG. (2)), and the data cell which was temporarily stored in the CDB is also transmitted through the line.

During the next time slot, nothing happens—the bit in the (right) end position of the CAR does not have the value of "0" in either of the two stations, whereas only an "empty" permit code appears during said time slot. In the following time slot, a permit code for B is received which causes the oldest data cell in station B's CAB to be transmitted over the line; since there is no time difference between the appearance of a "1" bit in the end position of station B's CAR and the appearance of a permit code for B, the data cell does not need to be temporarily stored in the CDB.

Figure 3:
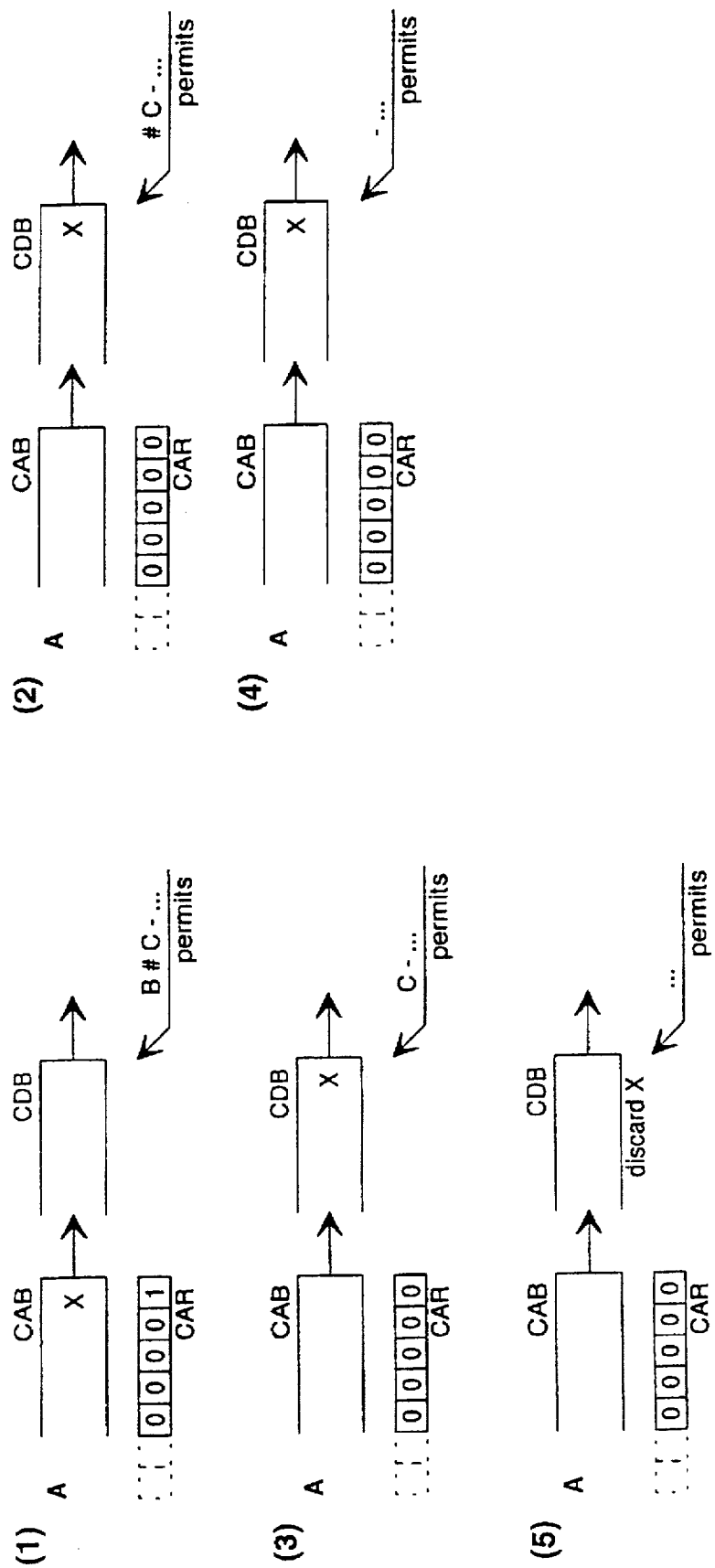
FIG. 3 illustrates the functioning in the case of an error in the transmission—from the central to the local station—of a permit code.

FIG. 3 shows the situation in which a data cell must be discarded as a result of an error in the transmission of a permit code, whereby, as it were, the balance between the data cells to be transmitted and the permit codes is maintained. In this Fig., only the CAB, CAR and CDB of station A are shown, namely at five consecutive time slots, in the sub-FIGS. (1) ... (5).

The situation is assumed where the end position of the CAR contains a "1" bit. At that moment a permit code for A or—see the situation in FIG. 2—a permit code for another station can be expected. Since the permit code is intended for another station—namely B—the data cell is put in the CDB. One time slot later—see (2)—a mutilated permit code is received ("#"): the value is regarded by station A as intended for another station (but the other stations will not recognise this permit code either, so not any of the stations will transmit a data cell). The data cell in the station A's CDB thus remains in said CDB. A time slot later again—see (3)—the local stations receive a permit code intended for station C, whereupon C transmits a data cell; the data cell in station A's CDB remains therein. However, if at the next time slot—see (5)—an "empty" permit code arrives ("—"), station A will detect thereby that the expected permit code will not come (apparently the mutilated permit code "#" should have had the value of "A") and, for the sake of a permanent equilibrium between the data cells and the permit codes—which, of course, must on the whole be equal to each other—the data cell in the CDB will be discarded. In the event that the CDB meanwhile contains further data cells, these are also discarded; their permit codes too, of course, must—according to the empty permit code which has appeared—have been lost on the way.

Figure 4:
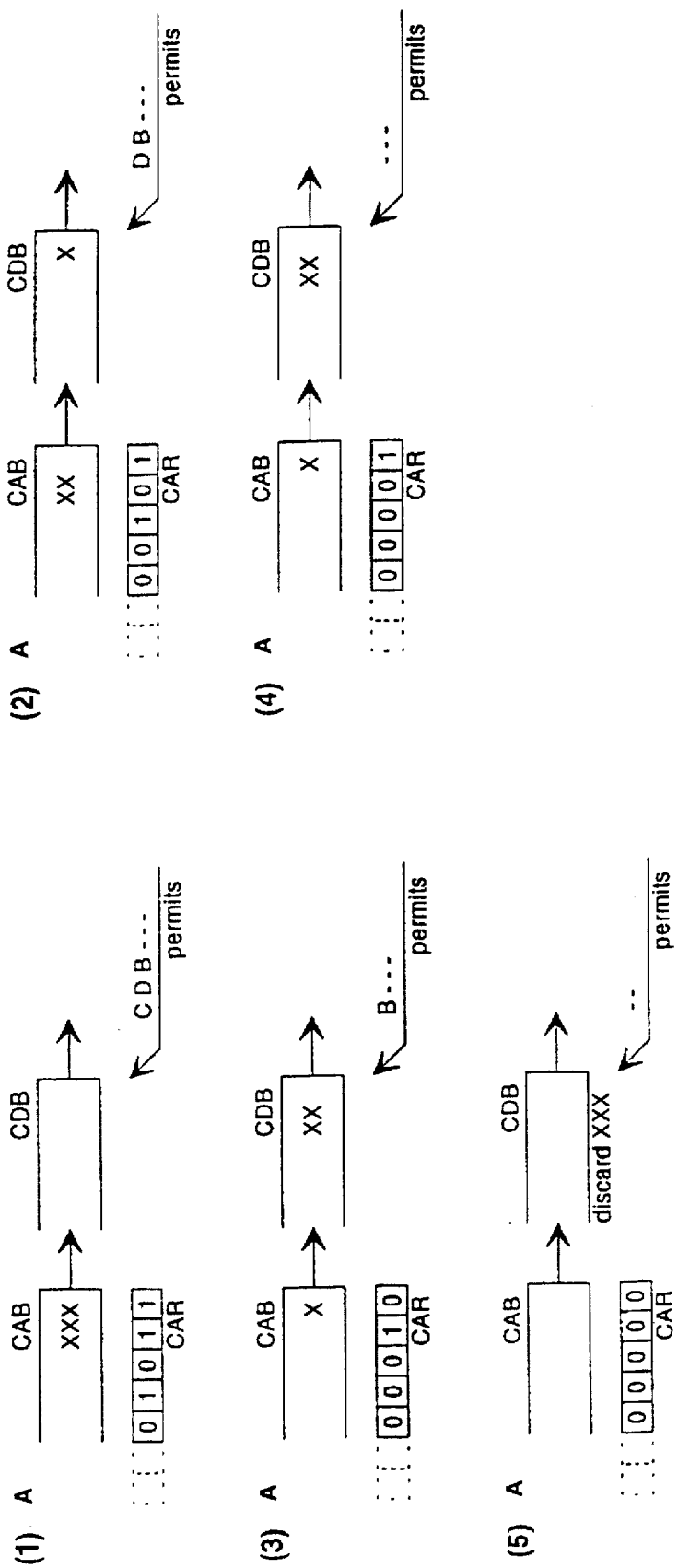
FIG. 4 illustrates the functioning in the case of an error in the transmission—from the local to the central station—of the register code.

FIG. 4 shows the course of events on the occurrence of an error in the previous transmission of the register code. In this case also only station A has been drawn and the situation for five consecutive time slots has been represented in the sub-FIGS. (1) ... (5).

The situation is assumed where the CAB contains three data cells and the two oldest bits in the CAR have the value of "1". If an uncorrectable error has occurred in the transmission of the register code (with a length of five bits in these examples), further consecutive permit codes may thus be absent, namely just as many as the number of "1" bits which were present in the register code. In FIG. 4 a number of consecutive permit codes are transmitted ("CDB--") of which none, however, have station A as address (whereas A still expects a permit code intended for it, since the rightmost bit in the CAR is "1"). Since the expected permit code for station A remains forthcoming during three consecutive time slots, the three data cells "X" in the CAB are successively transferred to the CDB. However, since an empty permit code follows ("—") after the reception of the permit codes C, D and B—which are not intended for A—the data cells in the CDB are discarded. Essentially, the mechanism is the same as described for FIG. 3.

REFERENCES

Netherlands Patent Application 9401697 (corresponding to U.S. application Ser. No. 08/544,210); not yet published on submission of the present application. The contents of this reference are deemed to be incorporated in the present application.

What is claimed is:

1. A method for the transmission to a central station of data cells presented to local stations, comprising the steps of:

registering arrivals of data cells at a local station in a cell arrival register (CAR);

transmitting characters entered in the cell arrival register by each local station to the central station, thereafter transmitting, by the central station to the local stations, permit codes containing permission to transmit a data cell ready for transmission;

transmitting the data cell ready for transmission to:

a cell departure buffer (CDB) if no permit code related to said data cell was received, and to the central station if a permit code related to said data cell was indeed received;

if the data cell ready for transmission was transmitted to the cell departure buffer:

leaving said data cell in the cell departure buffer as long as no permit code intended for the local station concerned is received, and transmitting the data cell residing in the cell departure buffer to the central station after the reception of a permit code intended for said local station; and discarding said data cell as soon as an empty permit code which was not addressed to any of the local stations by the central station is received, if said data cell still resides in the cell departure buffer.

2. A method according to claim 1, wherein:

said step of registering includes the steps of:

storing said data cell in a cell arrival buffer (CAB), entering a character having a first value ("1") in said cell arrival register (CAR), if a data cell is presented to a local station, whereby each character entered in the cell arrival register having the first value ("1") thus represents a data cell, and the cell arrival register in each local station can register at least 2*T characters, and entering a character having a second value ("0") in said cell arrival register, if an empty time slot is presented;

said step of transmitting characters includes the step of transmitting, by each local station to the central station, once per frame of T time slots, a register code corresponding to the last T characters entered in the cell arrival register, said step of transmitting permit codes includes the step of thereafter transmitting by the central station to the local stations permit codes, containing the permission to transmit the data cell most ready for transmission, on the basis of the position of the characters having the first value in the register codes received from the various stations;

said step of transmitting the data cell ready for transmission includes the step of transmitting the data cell most ready for transmission, if the character which represents the data cell most ready for transmission in the cell arrival register reaches a certain position in the said cell arrival register, to:

said cell departure buffer (CDB), if at that moment no permit code intended for said local station is received, and the central station, if at that moment a permit code intended for said local station is indeed received;

if the data cell most ready for transmission was transmitted to the cell departure buffer:

said step of leaving includes leaving said data cell in the cell departure buffer as long as permit codes for other local stations are received during subsequent time slots, and step of step of discarding includes the step of discarding said data cell if an empty permit code is received, and said step of transmitting the data cell residing in the cell departure buffer includes the step of transmitting the data cell residing in the cell departure buffer to the central station after the reception of a permit code intended for the station concerned.

* * * * *